United States Patent
Wee

(10) Patent No.: US 8,103,277 B2
(45) Date of Patent: Jan. 24, 2012

(54) MOBILE COMMUNICATION TERMINAL FOR HANDOVER FROM WCDMA NETWORK TO CDMA NETWORK AND METHOD THEREFOR

(75) Inventor: Seong Ho Wee, Gyeonggi-do (KR)

(73) Assignee: Pantech & Curitel Communications, Inc., Seoul (KR)

( * ) Notice: Subject to any disclaimer, the term of this patent is extended or adjusted under 35 U.S.C. 154(b) by 1061 days.

(21) Appl. No.: 11/440,506

(22) Filed: May 24, 2006

(65) Prior Publication Data

US 2007/0104147 A1     May 10, 2007

(30) Foreign Application Priority Data

Nov. 8, 2005    (KR) ........................ 10-2005-0106518

(51) Int. Cl.
*H04W 36/00* (2009.01)
*H04W 4/00* (2009.01)
*H04B 7/216* (2006.01)

(52) U.S. Cl. .......................... 455/436; 370/331; 370/320

(58) Field of Classification Search .................. 455/436; 370/331, 320

See application file for complete search history.

(56) References Cited

U.S. PATENT DOCUMENTS

| | | | | |
|---|---|---|---|---|
| 5,999,560 | A * | 12/1999 | Ono ............................... | 375/148 |
| 7,151,756 | B1 * | 12/2006 | Park et al. ...................... | 370/331 |
| 2004/0057468 | A1 * | 3/2004 | Shieh et al. .................... | 370/514 |
| 2005/0128980 | A1 * | 6/2005 | Han et al. ...................... | 370/331 |
| 2005/0221824 | A1 | 10/2005 | Lee et al. | |
| 2007/0064648 | A1 * | 3/2007 | Kim et al. ...................... | 370/331 |
| 2009/0059861 | A1 * | 3/2009 | Gunnarsson et al. .......... | 370/331 |

FOREIGN PATENT DOCUMENTS

| | | |
|---|---|---|
| JP | 2001186552 A | 7/2001 |
| KR | 10-2005-0046835 A | 5/2005 |
| WO | 2004091244 | 10/2004 |
| WO | 2005067177 | 7/2005 |

OTHER PUBLICATIONS

European Search Report, Application No. EP 06 25 2825, Jun. 6, 2007, 9 pages.
"Universal Mobile Telecommunications System (UMTS)," ETSI Standards, European Telecommunications Standards Institute, Dec. 2003, pp. 1-880, vol. 3-R2, No. V3170.
Notice of Rejection from Korean Intellectual Property Office mailed on Nov. 11, 2006 for South Korean Patent Application No. 10-2005-0106518, with English translation.

* cited by examiner

*Primary Examiner* — Dwayne Bost
*Assistant Examiner* — Timothy Pham
(74) *Attorney, Agent, or Firm* — H.C. Park & Associates, PLC

(57) ABSTRACT

A handover method from a WCDMA network to a CDMA network in a system comprising a mobile communication terminal, a RNC of the WCDMA network and a BSC of the CDMA network comprises: transmitting a measurement control message for commanding cell power measurement on a WCDMA cell and a beacon cell in the RNC into the mobile communication terminal; transmitting a measurement report message into the RNC in the mobile communication terminal after measurement of the cell power on the WCDMA cell and the beacon cell; and determining a handover into a CDMA cell in the RNC depending on the measurement report message when there is no more receivable WCDMA cell.

10 Claims, 3 Drawing Sheets

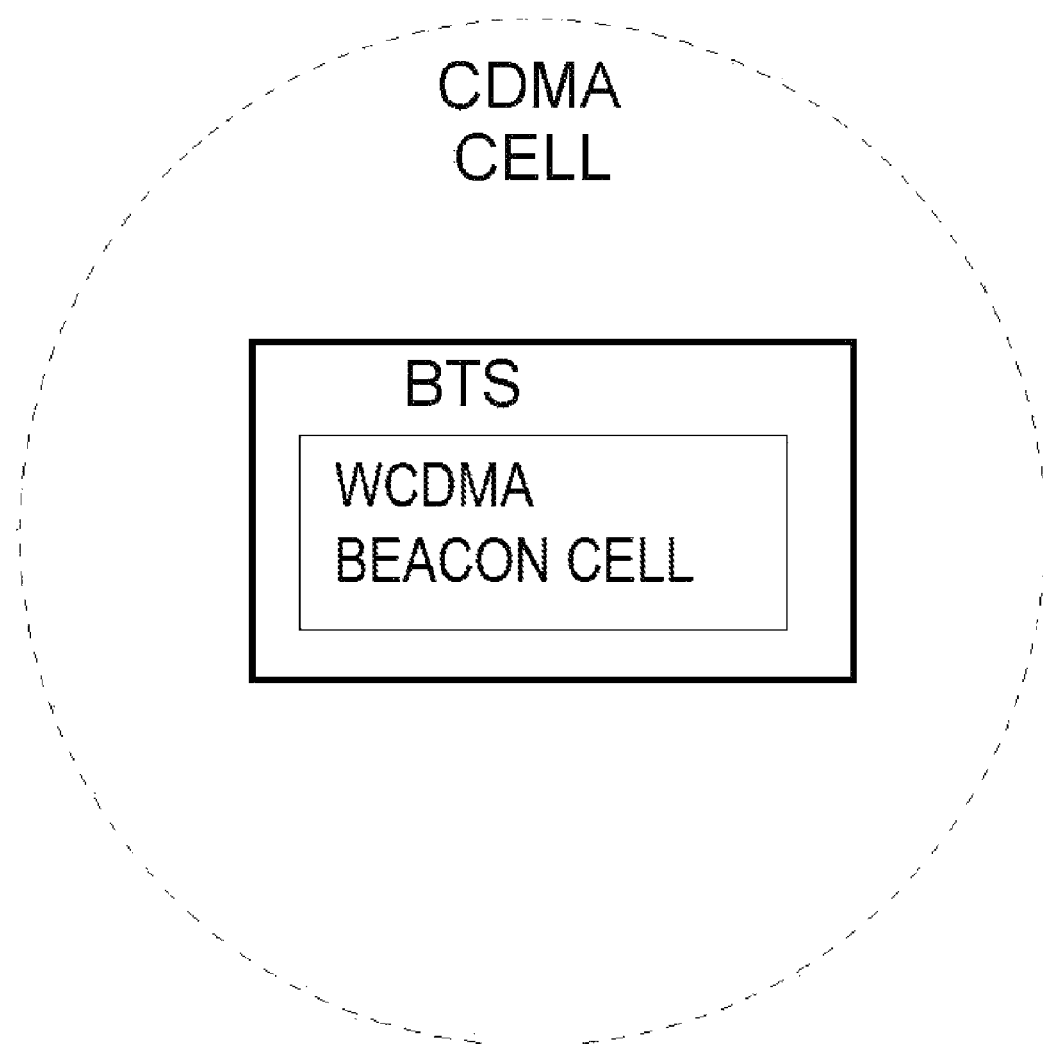

MOBILE COMMUNICATION TERMINAL FOR HANDOVER FROM WCDMA NETWORK TO CDMA NETWORK AND METHOD THEREFOR

CROSS-REFERENCE TO RELATED APPLICATION

The present application claims priority from and the benefit of Korean patent application No. 10-2005-0106518, filed on Nov. 8, 2005.

BACKGROUND OF THE INVENTION

1. Field of the Invention

The present invention generally relates to a mobile communication terminal for handover from a WCDMA network to a CDMA network and method therefor, and more specifically, to a technology of installing a WCDMA beacon cell in a CDMA cell to indirectly measure a CDMA cell power level through measurement of a WCDMA beacon cell power level, thereby performing a handover effectively.

2. Description of the Related Art

A handover refers to a function of automatically converting a communication channel of a current cell into that of the other cell to keep communication continued when a mobile communication terminal moves from the current cell to the other cell. A general method for converting a communication channel is as follows. First, a base station of a current cell measures a received signal strength indication (RSSI) of a communication channel, and informs a switching center when the strength decreases below a regulation level. Then, the switching center searches an available channel of a predetermined neighbor group list to convert the communication channel.

The handover is performed among cells using the same radio access technology (hereinafter, referred to as "RAT") as well as those using different RATs, for example, cells of a CDMA network and a WCDMA network.

When the handover is performed among cells using the different RATs, it is important to measure a cell power level of the different RAT. For example, call connection may be disconnected when a blind handover is performed without measurement of the cell power level of the different RAT.

However, when a handover is performed from a WCDMA cell to a CDMA cell under a current 3GPP standard, there is no method for reporting information on the power level of the CDMA cell. That is, a field for reporting the information under the 3GPP standard is not defined. As a result, there is a limit in proliferation of WCDMA under a communication circumstance of CDMA.

SUMMARY OF THE INVENTION

Various embodiments of the present invention are directed at installing a WCDMA beacon cell in a CDMA cell to indirectly measure a CDMA cell power level through measurement of a WCDMA beacon cell power, thereby performing a handover effectively.

According to one embodiment of the present invention, there is provided a handover method from a WCDMA network to a CDMA network in a system comprising a mobile communication terminal, a RNC of the WCDMA network and a BSC of the CDMA network. The handover method comprises: transmitting a measurement control message for commanding cell power measurement on a WCDMA cell and a beacon cell in the RNC into the mobile communication terminal; transmitting a measurement report message into the RNC in the mobile communication terminal after measurement of the cell power on the WCDMA cell and the beacon cell; and determining a handover into a CDMA cell in the RNC depending on the measurement report message when there is no more receivable WCDMA cell.

According to another embodiment of the present invention, a mobile communication terminal for handover from a WCDMA network to a CDMA network comprises: a WCDMA transceiver unit configured to receive a signal transmitted from the WCDMA network and transmit a signal into the WCDMA network; a CDMA transceiver unit configured to receive a signal transmitted from the CDMA network and transmit a signal into the CDMA network; and a control unit configured to control the WCDMA transceiver unit and the CDMA transceiver unit so as to perform a handover from the WCDMA network to the CDMA network. Preferably, the WCDMA transceiver unit is configured to measure a cell power level on a beacon cell located in a CDMA cell.

BRIEF DESCRIPTION OF THE DRAWINGS

Other aspects and advantages of the present invention will become apparent upon reading the following detailed description and upon reference to the drawings in which:

FIG. 3 is a diagram of a WCDMA beacon cell installed in a Base Transceiver Station of a CDMA cell according to an exemplary embodiment.

DETAILED DESCRIPTION OF THE EXEMPLARY EMBODIMENTS

The present invention will be described in detail with reference to the accompanying drawings. Wherever possible, the same reference numbers will be used throughout the drawings to refer to the same or like parts.

Figure 1:
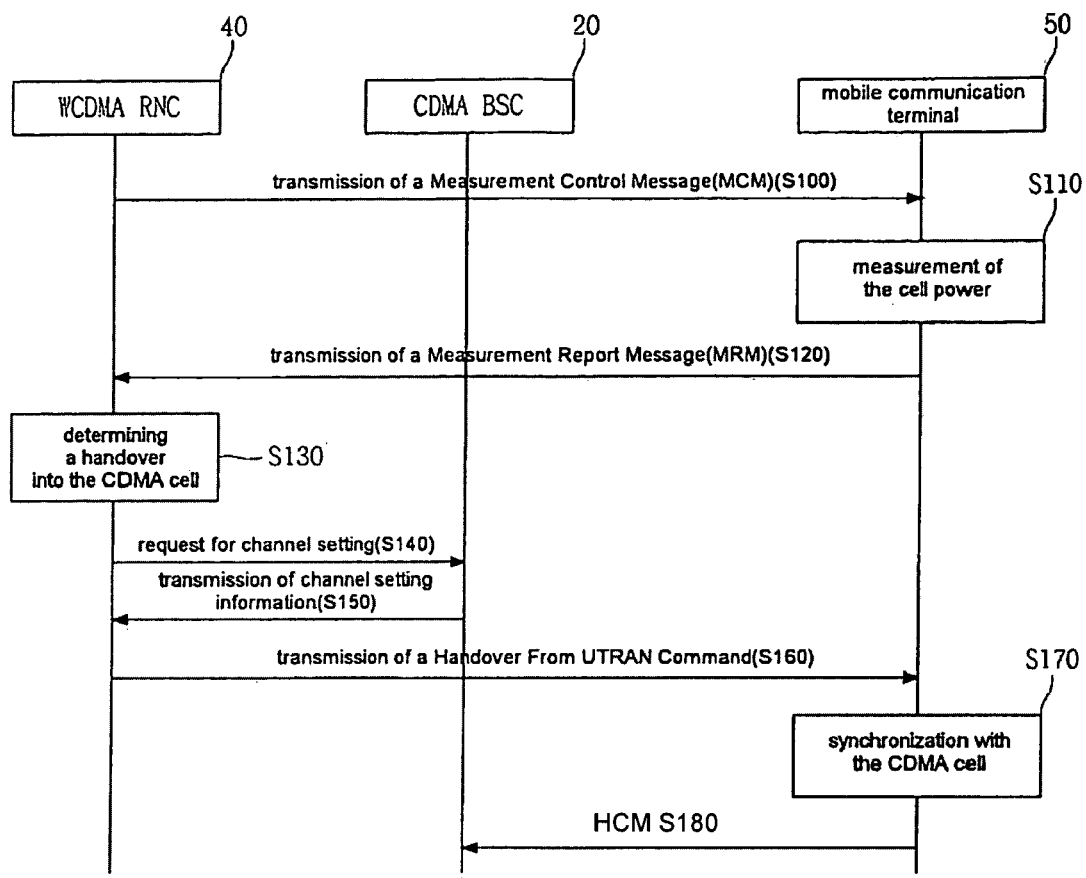
FIG. 1 is a flow chart illustrating a handover method from a WCDMA network to a CDMA network according to an embodiment of the present invention.

FIG. 1 is a flow chart illustrating a handover method from a WCDMA network to a CDMA network according to an embodiment of the present invention.

A CDMA network comprises a Base Transceiver Station (hereinafter, referred to as "BTS")(not shown) and a Base Station Controller (hereinafter, referred to as "BSC") 20, and a WCDMA network comprises a Node B (not shown) and a Radio Network Controller (hereinafter, referred to as "RNC") 40.

Referring to FIG. 1, the RNC 40 transmits a Measurement Control Message (hereinafter, referred to as "MCM") for commanding measurement of a cell power level on a WCDMA cell and a beacon cell into a mobile communication terminal 50 (S100).

The MCM includes a Measurement Identity (hereinafter, referred as "ID"), a Measurement Command, a Measurement Report Mode, an Additional Measurement List and a Choice Measurement Type. The Choice Measurement Type includes Intra-frequency measurement, Inter-frequency measurement and Inter-RAT measurement depending on kinds of measurement. The MCM also includes cell code information, a transmission power and a cell ID depending on each measurement type.

When transmitting the MCM, the RNC 40 enables the mobile communication terminal 50 to measure a cell power level of the beacon cell by including a primary scrambling code (P-SCR) information of the beacon cell.

Preferably, a base station of the beacon cell is located in the BTS of the CDMA cell.

Preferably, the beacon cell transmits a signal at the same cell power level as that of the CDMA cell.

Since the base station of the beacon cell is located in the BTS of the CDMA cell, the mobile communication terminal 50 measures a cell power level of the beacon cell to estimate a cell power of the CDMA cell.

Preferably, the beacon cell transmits a Primary Common Pilot Channel (hereinafter, referred to as "PCPICH"), a Primary Sync Channel (hereinafter, referred to as "PSCH"), a Secondary Sync Channel (hereinafter, referred to as "SSCH") and a Primary Common Control Physical Channel (hereinafter, referred to as "PCCPCH").

The above-described channels are used in the WCDMA network. The PSCH and the SSCH that include basic synchronization information initially obtained by the mobile communication terminal 50 are required for acquisition of a scrambling code of the WCDMA cell. The PCPICH that includes synchronization information receivable after the acquisition of the scrambling code is a base of synchronization of other channels. The PCCPCH transmits broadcasting information on a cell or a system into the mobile communication terminal 50.

The mobile communication terminal 50 measures the cell power of the WCDMA cell and the beacon cell (S110), and then transmits a Measurement Report Message (hereinafter, referred to as "MRM") into the RNC 40 (S120).

The MRM includes a Measurement ID, Measured Results and Additional Measured Results. The Measured Results include Intra-frequency measured results, Inter-frequency measured results and Inter-RAT measured results depending on measured kinds. Each of the measured results includes a cell ID, Cell synchronization information, Ec/No, Received Signal Code Power (hereinafter, referred to as "RSCP"), Delta_RSCP and Pathloss.

The RNC 40 analyzes the RSCP or SNR (Signal to Noise Ratio) which is cell power information of the received measurement report to determine a handover into the CDMA cell when there is no more receivable WCDMA cells (S130). Here, algorithm for determining a handover into the CDMA cell is an option of system companies and service providers.

Then, the RNC 40 requests channel setting into the BSC 20 (S140).

The BSC 20 sets a specific channel in the corresponding BTS, and transmits channel setting information into the RNC 40 (S150).

The RNC 40 transmits information received from the BSC 20 into the mobile communication terminal 50 via a Handover From UTRAN Command (S160).

The Handover From UTRAN command includes various information required when the mobile communication terminal receive a signal of the CDMA BTS such as Pilot PN sequence offset index and CDMA channel assignment.

The mobile communication terminal 50 sets a CDMA channel depending on the Handover From UTRAN Command, and acquires synchronization with the CDMA cell (S170).

After synchronization with the CDMA cell, the mobile communication terminal 50 transmits a Handover Complete Message (hereinafter, referred to as "HCM") into the BSC 20 (S180).

The HCM includes information on whether the CDMA channel setting and the synchronization acquiring process of the CDMA cell are properly performed.

The handover process is finished after the BSC 20 receives the HCM, and the mobile communication terminal 50 is now operated in the CDMA network.

Figure 2:
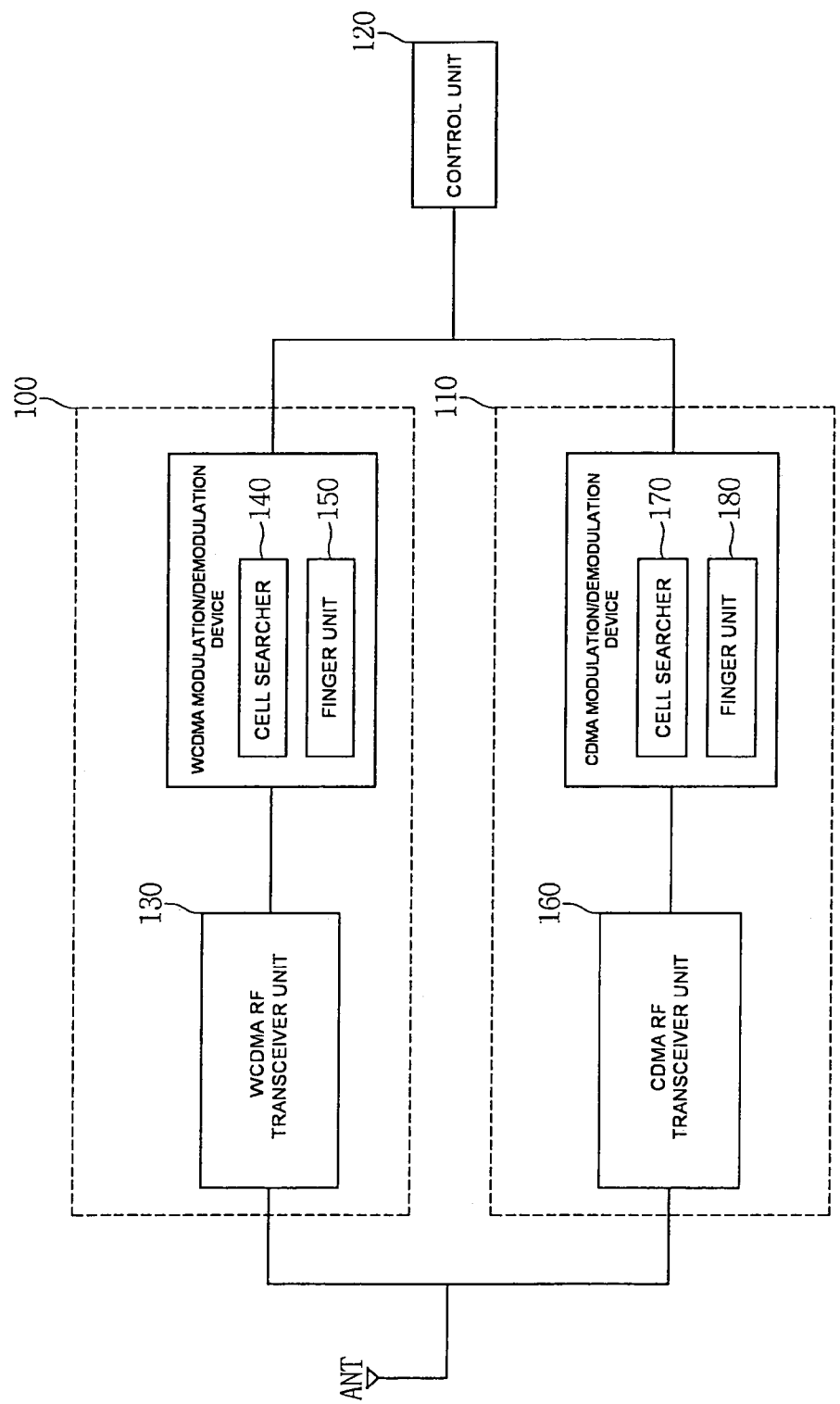
FIG. 2 is a block diagram illustrating a mobile communication terminal for performing a handover from a WCDMA network to a CDMA network according to an embodiment of the present invention.

FIG. 2 is a block diagram illustrating a mobile communication terminal for performing a handover from a WCDMA network to a CDMA network according to an embodiment of the present invention.

Referring to FIG. 2, the mobile communication terminal 50 comprises a WCDMA transceiver unit 100, a CDMA transceiver unit 110 and a control unit 120.

Each of the WCDMA transceiver unit 100 and the CDMA transceiver unit 110 comprises RF transceiver units 130 and 160, cell searchers 140 and 170, and finger units 150 and 180.

The WCDMA transceiver unit 100 measures a cell power level of the beacon cell which is located in the CDMA cell, as shown in FIG. 3.

The control unit 120 controls the WCDMA transceiver unit 100 and the CDMA transceiver unit 110 so as to measure a cell power level depending on a measurement control message for commanding cell power measurement on the WCDMA cell and the CDMA cell, to transmit the MRM into the RNC 40 after measurement of the cell power on the WCDMA cell and the beacon cell, to set a CDMA channel and acquire synchronization with the CDMA cell depending on the Handover From UTRAN Command, and to transmit the HCM into the BSC 20 after synchronization with the CDMA cell.

As described above, in a handover method from a WCDMA network to a CDMA network according to an embodiment of the present invention, a WCDMA beacon cell is installed in a CDMA cell, and a mobile communication terminal indirectly measures a power level of the CDMA cell through measurement of a power level of a WCDMA beacon cell. As a result, a handover is effectively performed from the WCDMA network to the CDMA network without any disconnection of call connection.

The foregoing description of various embodiments of the invention has been presented for purposes of illustration and description. It is not intended to be exhaustive or to limit the invention to the precise form disclosed, and modifications and variations are possible in light of the above teachings or may be acquired from practice of the invention. Thus, the embodiments were chosen and described in order to explain the principles of the invention and its practical application to enable one skilled in the art to utilize the invention in various embodiments and with various modifications as are suited to the particular use contemplated.

What is claimed is:

1. A handover method from a WCDMA (wideband code division multiple access) network to a CDMA (code division multiple access) network in a system comprising a mobile communication terminal, a RNC (radio network controller) of the WCDMA network and a BSC (base station controller) of the CDMA network, the handover method comprising:

in the RNC, transmitting a measurement control message for commanding cell power measurement on a WCDMA cell and a WCDMA beacon cell installed in a Base Transceiver Station of a CDMA cell to the mobile communication terminal;

in the mobile communication terminal, transmitting a measurement report message to the RNC after measurement of the cell power level on the WCDMA cell and the WCDMA beacon cell;

determining a cell power level of the CDMA cell to have a same power level as the measured cell power level of the WCDMA beacon cell; and in the RNC, determining a handover into the CDMA cell when there is no more receivable WCDMA cell depending on the measurement report message, wherein the WCDMA beacon cell transmits a signal at the same cell power level as that of the CDMA cell.

2. The handover method according to claim 1, wherein a base station of the WCDMA beacon cell is located in that of the CDMA cell.

3. The handover method according to claim 1, wherein the WCDMA beacon cell transmits a primary common pilot channel (PCPICH), a primary sync channel (PSCH), a secondary sync channel (SSCH), and a primary common control physical channel (PCCPCH).

4. The handover method according to claim 1, further comprising:
   in the RNC, requesting channel setting to the BSC;
   in the BSC, transmitting channel setting information to the RNC after a predetermined channel is set;
   in the RNC, transmitting information received from the BSC to the mobile communication terminal via a Handover From UTRAN (Universal Mobile Telecommunications System Terrestrial Radio Access Network) Command;
   in the mobile communication terminal, setting a CDMA channel depending on the Handover From UTRAN Command to acquire synchronization with the CDMA cell; and
   transmitting a Handover Complete Message into the BSC after synchronization with the CDMA cell.

5. A mobile communication terminal for handover from a WCDMA (wideband code division multiple access) network to a CDMA (code division multiple access) network, the terminal comprising:
   a WCDMA transceiver unit to receive a signal transmitted from the WCDMA network and to transmit a signal into the WCDMA network;
   a CDMA transceiver unit to receive a signal transmitted from the CDMA network and to transmit a signal into the CDMA network; and
   a control unit to control the WCDMA transceiver unit and the CDMA transceiver unit so as to perform a handover from the WCDMA network to the CDMA network,
   wherein the WCDMA transceiver unit measures a cell power level on a WCDMA beacon cell located in a Base Transceiver Station of a CDMA cell, and a cell power level of the CDMA cell is determined to have a same power level as the measured cell power level of the WCDMA beacon cell, and
   wherein the WCDMA beacon cell transmits a signal at the same cell power level as that of the CDMA cell.

6. The mobile communication terminal according to claim 5, wherein each of the WCDMA transceiver unit and the CDMA transceiver unit comprises a RF transceiver unit, a cell searcher and a finger unit.

7. The mobile communication terminal according to claim 5, wherein the control unit controls the WCDMA transceiver unit and the CDMA transceiver unit so as to measure a cell power level depending on a measurement control message for commanding cell power measurement on the WCDMA cell and the CDMA cell.

8. The mobile communication terminal according to claim 5, wherein the control unit controls the WCDMA transceiver unit and the CDMA transceiver unit so as to transmit a measurement report message after measurement of the cell power level on the WCDMA cell and the beacon cell.

9. The mobile communication terminal according to claim 5, wherein the control unit controls the WCDMA transceiver unit and the CDMA transceiver unit so as to set a CDMA channel and acquire synchronization with the CDMA cell depending on the Handover From UTRAN Command.

10. The mobile communication terminal according to claim 5, wherein the control unit controls the WCDMA transceiver unit and the CDMA transceiver unit so as to transmit a Handover Complete Message after synchronization with the CDMA cell.

* * * * *